(No Model.) 2 Sheets—Sheet 1.
J. W. RYKARD.
COTTON CHOPPER.
No. 354,519. Patented Dec. 14, 1886.
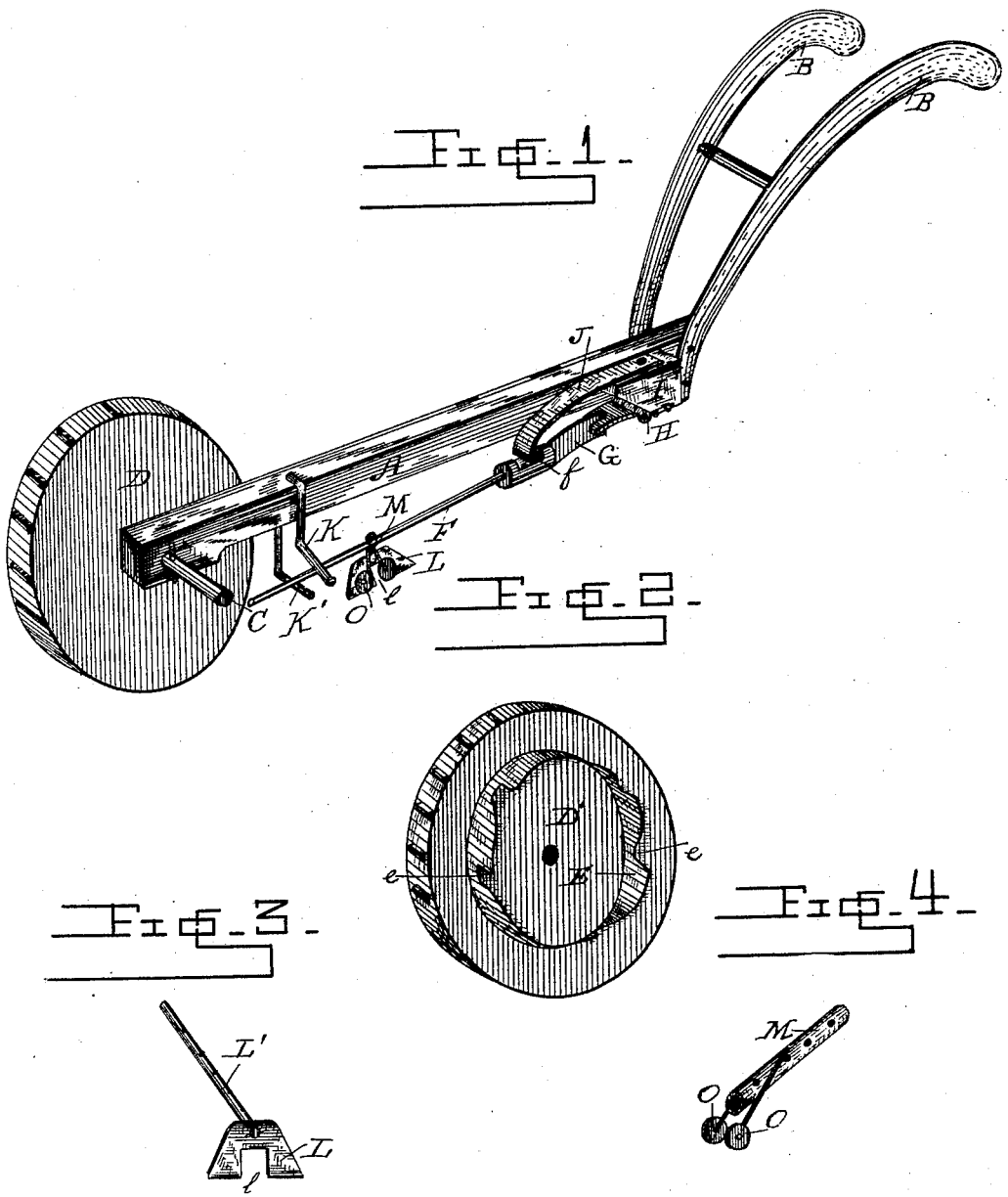
WITNESSES: Jos H Blackwood
INVENTOR: John W. Rykard
by M. W. Doolittle, Attorney (No Model.)
J. W. RYKARD.
COTTON CHOPPER.
No. 354,519. Patented Dec. 14, 1886.
2 Sheets—Sheet 2.
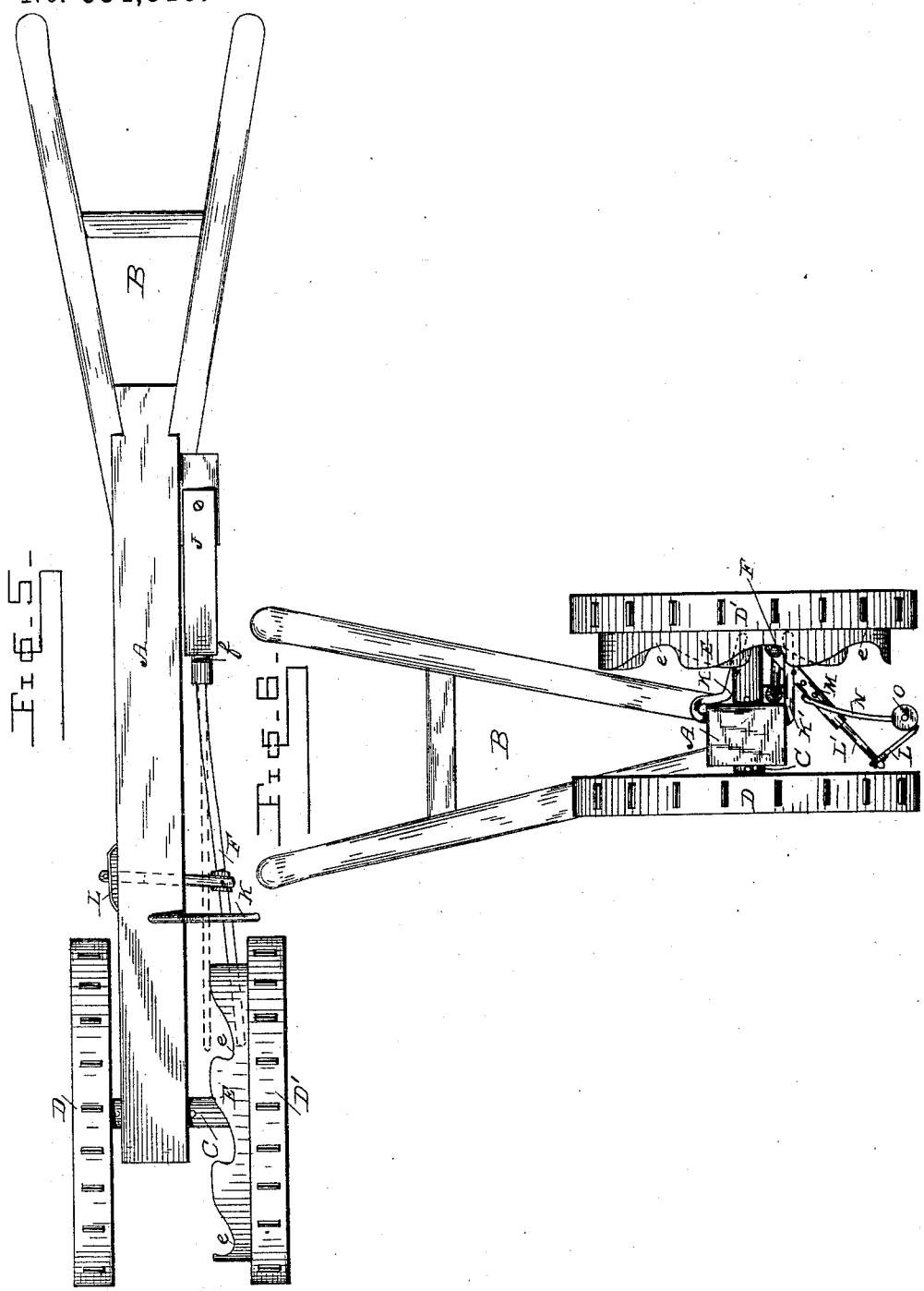

UNITED STATES PATENT OFFICE.

JOHN W. RYKARD, OF ABBEVILLE, SOUTH CAROLINA.

COTTON-CHOPPER.

SPECIFICATION forming part of Letters Patent No. 354,519, dated December 14, 1886.

Application filed March 30, 1886. Serial No. 197,164. (No model.)

*To all whom it may concern:*

Be it known that I, JOHN W. RYKARD, a citizen of the United States, residing at Abbeville, in the county of Abbeville and State of South Carolina, have invented certain new and useful Improvements in Cotton-Choppers; and I do hereby declare the following to be a full, clear, and exact description of the invention, such as will enable others skilled in the art to which it appertains to make and use the same.

My invention relates to certain improvements in cotton-choppers; and it has for its object the production of a simple and effective machine for chopping out surplus plants and leaving stands of cotton at regular intervals, which may be operated either by hand or horse power.

The invention will be first fully described in connection with the accompanying drawings, and then clearly defined in the claims.

Figure 1 of the drawings is a perspective view of my machine with the left-hand driving-wheel removed. Fig. 2 is a perspective view of the left-hand driving-wheel, showing the circular cam-plate attached to its inner side. Fig. 3 is a view of the hoe. Fig. 4 is a view of the hoe-sleeve with the travelers attached; Fig. 5, a plan view of the entire machine, and Fig. 6 a front elevation.

Referring to the drawings, A represents the beam of the machine, to the rear end of which are attached handles B, similar to the handles of a plow. Through the front end of the beam is passed an axle, C, which revolves freely therein, and on the ends of which are the driving-wheels D D', rigidly mounted, in order to insure their simultaneous revolution, so that the machine may be easily directed in its proper course. On the inner side of the left-hand driving-wheel D' there is attached a circular plate, E, which, for convenience of description, I will term the "cam-plate." In the edge of this plate, at proper intervals, there are formed cam-like notches $e$, the purpose of which will presently appear.

F represents a hoe-actuating rod extending longitudinally of the beam, its front end engaging with the cam-plate E. The rear end of this rod is enlarged, as shown, and in the top side of this enlarged portion is formed a notch, $f$.

G represents a flat spring, one end of which is rigidly secured in the rear end of rod F, while its other end is likewise secured to a hinge, H, attached to the under side of a block, I, fixed to the side of beam A, the resilient action of this spring being in a direction transversely of the machine.

J represents a spring-plate, one end of which is secured to the top of block I and its other end is curved downward and rests in notch $f$ in rod F.

K is an inclined guide for moving rod F out of the notches in the cam-plate.

K' is a guard for preventing rod F dropping out of range of the notches in the cam-plate.

L represents the hoe-blade provided with a handle, L'. The front edge of this blade is cut out at the center, leaving a recess, $l$, as shown, for the reception at each stroke of the hoe of that portion of the cotton in the row which it is desired to leave standing.

M represents the hoe-sleeve, rigidly secured to rod F a short distance in rear of the driving-wheels. The hoe is adjustable in this sleeve, so as to cut to the desired depth, by means of a series of holes in both the sleeve and handle of the hoe, through which a pin is passed. (Not shown.) To each side of the sleeve is secured an arm, N, which arms extend downward and forward, and carry on their lower ends rollers or travelers O, one on each side of the recess in the hoe, as shown in Fig. 1, these travelers serving to prevent the hoe from sinking deeper into the ground than intended by the set given it.

The operation of my machine is as follows: The machine being moved along the row of cotton, the free end of rod F will be carried upward by the inclined side of the notches in the cam-plate E (its rear end, through its connection, turning on the hinge) until the rod strikes against the inclined guide K, by which it will be deflected out of the notch, these movements of the rod giving the hoe an upward and an outward movement to raise it over the cotton. As soon as the rod has cleared the notch it is forced downward by spring J (thus lowering the hoe) until it comes opposite the next notch in the cam-plate, when spring G throws the rod sidewise into it, thereby giving the hoe a chopping action. The hoe will be prevented from sinking too deep into the soil by the travelers suspended above the hoe rolling over the surface. The hoe will chop all plants but those falling within its recess, which will be left undisturbed. The length of the stroke of the hoe across the row is regulated by the depth of the notches in the cam-plate, while the spaces between the stands of cotton left after chopping are regulated by the distance between the notches in said cam-plate.

Having thus described my invention, what I claim, and desire to secure by Letters Patent, is—

1. In a cotton-chopper, the combination, with a hoe-actuating rod, of a hoe-sleeve, a recessed hoe adjustable in said sleeve, and two arms secured to the sleeve, each arm carrying a roller or traveler on its lower end, which rollers or travelers overhang the hoe, one on each side of its recess, substantially as described, and for the purpose set forth.

2. The combination, with a cam-plate secured to one of the driving-wheels, of a hoe-actuating rod, one end of which is in contact with the cam-plate, while its other end is attached to a spring-plate, the said spring being in turn attached to a hinge and arranged so that its resilient action is in a direction transversely of the machine, an inclined guide above the rod for moving it out of the notch in the cam-plate, a spring bearing on top of the rod to force it downward after it has left a notch, and a hoe adjustably attached to the rod, all substantially as described.

In testimony whereof I affix my signature in presence of two witnesses.

JOHN W. RYKARD.

Witnesses:
JAS. M. LAWSON,
L. D. CONNOR.